Dec. 31, 1940.  E. A. A. GRÖNWALL  2,227,255
METHOD AND DEVICE FOR TREATING A MOLTEN METALLIC MATERIAL
Filed Aug. 10, 1939
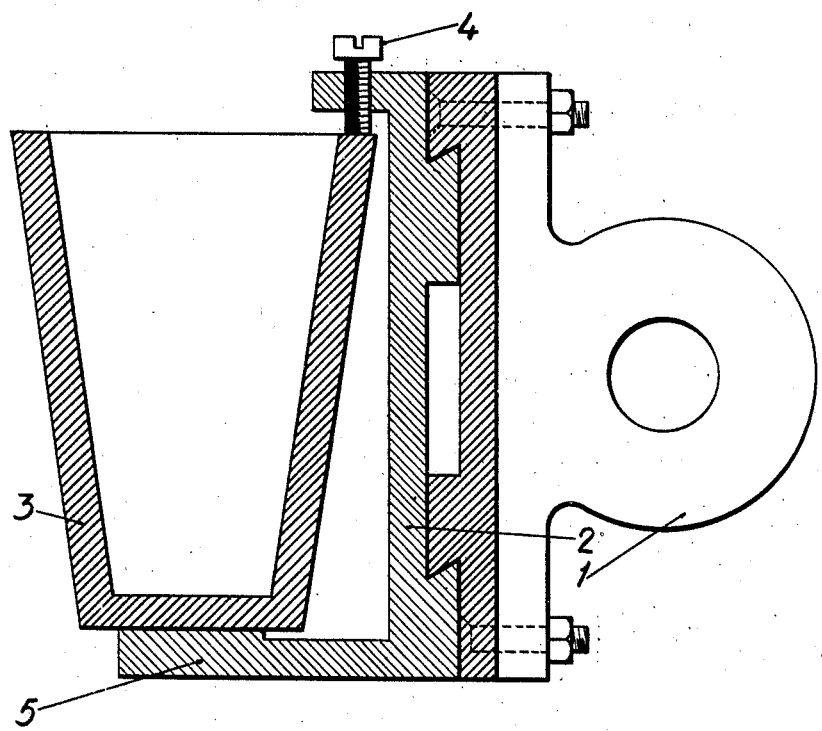
Inventor
Eugen Assar Alexis Gronwall
By
Munn, Anderson & Liddy
Attorneys

UNITED STATES PATENT OFFICE 2,227,255

METHOD AND DEVICE FOR TREATING A MOLTEN METALLIC MATERIAL

Eugen Assar Alexis Grönwall, Stockholm, Sweden

Application August 10, 1939, Serial No. 289,336
In Sweden September 28, 1938

4 Claims. (Cl. 266—34)

The present invention relates to a method of treating molten metal or metal alloy for removing gases, taking off the slags and for preventing crystallisation at the freezing by means of vibration effected by an electrical vibration motor, the stator of which, directly or via a vibration frame, at at least two places is rigidly connected with the container (furnace, chill mould, ladle or the like) in which the molten metal is.

According to the invention the vibrations that are created in the stator of a fast running electric vibration motor upon the rotation of its rotor are preferably transferred to a frame coupled to the frame of the motor, from where the vibrations by means of rigid struts are conveyed to the container for the molten metal. The motor has preferably a speed of about 1500–3000 revolutions per minute. The connection between the container and the frame should be arranged at several points or places.

In a vibration motor, i. e. a motor having an excentrically mounted rotor or a rotor provided with an excenter segment effecting vibrations, there are created vibrations which run through the stator radially from the centre of the same. According to the present invention these vibrations are transferred to the container, and thereby a result is obtained that cannot be effected by transferring the vibrations of the motor from the shaft of the motor to the container. If the stator is connected at several places with the container, there are effected several successive shocks upon each revolution of the rotor, which shocks cause a wavelike or sine curved movement in the molten metal. If, for example, a bipolar electric motor of the common 50 period type making 2,800 revolutions per minute, is used, and if three points of the stator, the spaces between the points being about ⅓ of the periphery, are connected to three points of the container, the metal contents of the container will receive 8,400 impulses per minute. With a fourpolar motor, making 1,400 revolutions per minute, and with four points of the stator connected to the container, the metal will receive 5,600 impulses per minute. Such number of vibrations between 5,000 and 10,000 is just suitable for removing gas and slags from the molten metal. When using a motor of three horse power the vibrations are transmitted from the container up to half a meter into the molten metal. From this it will be clear that a very effective removing of gas and slags can be obtained within a short time before the metal has time to freeze. Even if one can diagrammatically say that certain points of the stator are connected with certain points of the container, the connection is not, of course, in reality effected between points but between surfaces of several square centimetres or square decimetres, wherein the vibration is effected successively in a wave-like motion.

Since the vibration shocks from the outer surface of the stator have about the same direction in about one fourth of the periphery it may be suitable that those portions of the stator which are coupled to the container comprise up to one fourth of the periphery.

The connection may, for example, be provided at the bottom of the container and at the upper edge of the same or also by means of two groups of connecting terminals, provided on the side of the container, one or more terminal at the lower portion and one or more terminal at the upper portion of the same, said groups of terminals being located at a distance from each other that corresponds to half the height of the container, the upper group being positioned somewhat beneath the usual level of the molten metal in the container.

In order to make the invention clear reference is made to the accompanying drawing which shows a chill mould inserted in a vibration frame fastened to a vibration motor. Reference numeral 1 indicates the vibration motor, 2 the vibration frame and 3 the chill mould which is connected to the frame by means of the screw 4 at the upper edge of the chill mould, and rests on the support 5 of the frame.

When using a small motor the same may be made easily removable, for example by means of a suspension arrangement as shown in the figure. The motor may then be rapidly removed from one chill mould to another. The frame may be made so big that several chill moulds may simultaneously be introduced in the same. Several motors may be mounted in the same vibration frame.

When vibrating grey pig-iron in accordance with the invention the advantage is also obtained that formation of big graphite accumulations in the iron is prevented. If a molten metal alloy, for example containing zinc, lead or copper, is vibrated in accordance with the invention the formation of coarse crystals, which should otherwise take place is prevented.

Having now described my invention, what I claim as new and desire to secure by Letters Patent is:

1. The method of treating molten metallic material for removing gases, taking off slags and preventing crystallization at the freezing, which comprises transmitting vibrations from the stator of an electric vibration motor with a horizontal axis to at least two points of the container of said material, which in a plane perpendicular to said axis, are radially in relation to the same located in different angular positions.

2. A device for treating molten metallic material for removing gases, taking off slags and preventing crystallization at the freezing, comprising a container for said material, an electric vibration motor having a horizontal axis and a stator, at least two points of the container which in a plane perpendicular to said axis are, radially in relation to the same located in different angular positions, being connected with the stator in such a manner that the vibrations of the stator are transmitted to the container.

3. A device according to claim 2, in which a vibration frame is located intermediately of the container and the stator.

4. A device according to claim 2, in which at least one of the connection points is at the bottom of the container.

EUGEN ASSAR ALEXIS GRÖNWALL.